United States Patent
Do et al.

(10) Patent No.: US 7,081,309 B2
(45) Date of Patent: *Jul. 25, 2006

(54) MAGNETIC RECORDING DISK WITH ANTIFERROMAGNETICALLY-COUPLED MAGNETIC LAYER HAVING MULTIPLE FERROMAGNETICALLY-COUPLED LOWER LAYERS

(75) Inventors: Hoa Van Do, Fremont, CA (US); Eric Edward Fullerton, Morgan Hill, CA (US); David Margulies, Los Gatos, CA (US); Andreas Moser, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 242 days.

This patent is subject to a terminal disclaimer.

(21) Appl. No.: 10/808,020

(22) Filed: Mar. 23, 2004

(65) Prior Publication Data

US 2005/0214586 A1 Sep. 29, 2005

(51) Int. Cl.
*G11B 5/673* (2006.01)
(52) U.S. Cl. .................... 428/828.1; 428/829
(58) Field of Classification Search ............. None
See application file for complete search history.

(56) References Cited

U.S. PATENT DOCUMENTS

| | | | | |
|---|---|---|---|---|
| 5,851,643 A | * | 12/1998 | Honda et al. | 428/212 |
| 6,280,813 B1 | | 8/2001 | Carey et al. | |
| 6,794,057 B1 | * | 9/2004 | Wang et al. | 428/828.1 |
| 6,811,890 B1 | * | 11/2004 | Zhou et al. | 428/828.1 |
| 6,821,652 B1 | * | 11/2004 | Okamoto et al. | 428/828.1 |
| 6,828,036 B1 | * | 12/2004 | Munteanu et al. | 428/828.1 |
| 2003/0170499 A1 | * | 9/2003 | Okamoto | 428/694 MM |
| 2005/0190498 A1 | * | 9/2005 | Do et al. | 360/135 |

FOREIGN PATENT DOCUMENTS

| | | |
|---|---|---|
| EP | 1059629 A2 | 12/2000 |
| WO | WO-03-065356 A1 * | 8/2003 |

* cited by examiner

*Primary Examiner*—Kevin M. Bernatz
(74) *Attorney, Agent, or Firm*—Thomas R. Berthold

(57) ABSTRACT

A magnetic recording disk has an antiferromagnetically-coupled (AFC) structure that has an upper ferromagnetic layer (UL), and a lower ferromagnetic layer structure formed of two ferromagnetically-coupled lower layers (LL1, LL2). The UL is antiferromagnetically-coupled to the lower layer structure across an antiferromagnetically-coupling layer. LL1 and LL2 are ferromagnetically coupled across a ferromagnetic coupling layer so the magnetizations of LL1 and LL2 remain parallel in each remanent magnetic state, but are antiparallel to the magnetization of the UL in each remanent magnetic state. The UL has an Mrt greater than the sum of the Mrt values of LL1 and LL2.

14 Claims, 2 Drawing Sheets

MAGNETIC RECORDING DISK WITH ANTIFERROMAGNETICALLY-COUPLED MAGNETIC LAYER HAVING MULTIPLE FERROMAGNETICALLY-COUPLED LOWER LAYERS

RELATED APPLICATION

This application is related to pending application Ser. No. 10/788,687, filed Feb. 26, 2004 and entitled "MAGNETIC RECORDING DISK WITH ANTIFERROMAGNETICALLY-COUPLED MAGNETIC LAYER HAVING MULTIPLE LOWER LAYERS".

TECHNICAL FIELD

This invention relates generally to magnetic recording disks used in magnetic recording hard disk drives, and more particularly to a magnetic recording disk that has an antiferromagnetically-coupled (AFC) magnetic layer.

BACKGROUND OF THE INVENTION

As the storage density of magnetic recording hard disks has increased, there has been a corresponding reduction in the magnetization-remanence-thickness product (Mrt), and a corresponding increase in the coercivity ($H_c$), of the magnetic recording layer. Mrt is the product of the recording layer thickness t and the remanent (zero applied magnetic field) magnetization Mr (where Mr is measured in units of magnetic moment per unit volume of ferromagnetic material) of the recording layer. $H_c$ is related to the short-time switching field or intrinsic coercivity ($H_0$) required by the disk drive write head to write data on the recording layer. The trends in Mrt and $H_c$ have led to a decrease in the ratio Mrt/$H_c$.

To achieve the reduction in Mrt, the thickness t of the magnetic layer can be reduced, but only to a limit because the stored magnetic information in the layer will be more likely to decay. This decay of the magnetization has been attributed to thermal activation of small magnetic grains (the superparamagnetic effect). The thermal stability of a magnetic grain is to a large extent determined by $K_UV$, where $K_U$ is the magnetic anisotropy constant of the layer and V is the volume of the magnetic grain. As the layer thickness is decreased, V decreases. If the layer thickness is too thin, $K_UV$ becomes too small and the stored magnetic information will no longer be stable at normal disk drive operating conditions.

One approach to the solution of this problem is to move to a higher anisotropy material (higher $K_U$). However, the increase in $K_U$ is limited by the point where the coercivity $H_c$, which is approximately equal to $K_U/M_S$ ($M_S$=saturation magnetization), becomes too great to be written by a conventional recording head. A similar approach is to reduce the $M_S$ of the magnetic layer for a fixed layer thickness, which will reduce Mr since Mr is related to $M_S$, but this is also limited by the coercivity that can be written.

U.S. Pat. No. 6,280,813, assigned to the same assignee as this application, describes a magnetic recording medium wherein the magnetic recording layer is at least two ferromagnetic layers antiferromagnetically-coupled together across a nonferromagnetic spacer layer. In this type of magnetic media, referred to as AFC media, the magnetic moments of the two antiferromagnetically-coupled layers are oriented antiparallel in remanence, with the result that the net or composite Mrt of the recording layer is the difference between the Mrt of the upper and lower ferromagnetic layers. The upper ferromagnetic layer typically has a higher Mrt than the lower ferromagnetic layer so that the composite Mrt is given by $Mrt_{UL} - Mrt_{LL}$. This reduction in Mrt is accomplished without a reduction in volume V. Therefore the thermal stability of the recording medium is not reduced.

AFC media thus significantly improve the performance of magnetic recording disks. A low composite-Mrt means a low value of PW50, which is the half-amplitude pulse-width of an isolated read-back pulse of the recorded signal measured at low recording density. The PW50 value determines the achievable linear density, and a low value of PW50 is desirable. Therefore, the extendibility of AFC media is mainly determined by how much the structure can be used to reduce PW50, and this is determined by how large a value Mrt can be achieved in the lower ferromagnetic layer, since $Mrt_{COMPOSITE} = (Mrt_{UL} - Mrt_{LL})$.

However, with current AFC media there is a maximum Mrt value that can be used in the lower ferromagnetic layer. Above this maximum Mrt, the media's intrinsic signal-to-noise ratio ($S_0NR$) (the ratio of the isolated signal pulse to noise at a specific recording density), will become worse even though PW50 is still lowered and the composite Mrt is still dropping. For example, an AFC structure can be fabricated with a thicker lower ferromagnetic layer (increasing the lower layer Mrt by 0.05 memu/cm$^2$ above the maximum value) to achieve a PW50 value reduced by 3.5% from the reference AFC structure using the maximum lower layer Mrt. However, this results in an unacceptable decrease in $S_0NR$ of approximately 3.5 db. This is shown in FIG. 1.

There are two likely reasons why this decrease in $S_0NR$ occurs with AFC media when the lower layer becomes too thick. First, as the lower ferromagnetic layer is made thicker, its anisotropy-volume product ($K_UV$) increases. The $K_UV$ determines how susceptible the layer is to thermal fluctuations with the higher the $K_UV$ the less susceptible is the layer. It is well established that it is thermally-activated reversal that allows the small interlayer exchange field in AFC media to reverse the magnetization of the lower layer and thereby produce the desired antiparallel remanent configuration. Therefore, the higher the $K_UV$ of the lower layer (the higher the lower layer Mrt), the more difficult it is for the relatively small exchange field to completely reverse the magnetization of the lower layer. Second, the magnitude of the exchange field is inversely proportional to the lower layer Mrt, also making it more difficult for the antiferromagnetic interaction to reverse the magnetization of the lower layer as it becomes thicker. Therefore, as the lower layer Mrt is increased there are two effects that occur that make it more difficult to reverse the lower layer magnetization to form the antiparallel remanent configuration. These factors could cause some lower layer grains to not be antiparallel with their respective upper layer grains, possibly producing extra noise in the recorded signal causing the drop in $S_0NR$ that is measured. Increasing the exchange field by adding a high moment layer adjacent to the Ru layer is a potential way of postponing this problem, but the addition of this high moment layer reduces the $S_0NR$ such that in practice it is very difficult to significantly alter the exchange field without reducing $S_0NR$. Therefore, the problem of not being able to increase the thickness of the lower ferromagnetic layer in AFC media above some maximum value is a universal problem with these structures.

What is needed is a magnetic recording disk with an AFC structure that can take advantage of the reduction in composite Mrt and PW50, but without causing a reduction in $S_0NR$.

SUMMARY OF THE INVENTION

The invention is a magnetic recording disk with an AFC structure that has an upper ferromagnetic layer (UL), and a lower ferromagnetic layer structure formed of two ferromagnetically-coupled lower layers (LL1, LL2). The UL is antiferromagnetically-coupled to the lower layer structure across an antiferromagnetically-coupling layer. LL1 and LL2 are ferromagnetically coupled across a ferromagnetic coupling layer so the magnetizations of LL1 and LL2 remain parallel in each remanent magnetic state, but are antiparallel to the magnetization of the UL in each state. The UL has an Mrt greater than the sum of the Mrt values of LL1 and LL2. The composite Mrt of the AFC structure is less than the composite Mrt of the conventional AFC structure. The AFC structure is able to achieve this composite Mrt reduction without increasing the Mrt of any of the two lower layers above the maximum Mrt of the single lower layer in the conventional AFC structure, and therefore avoids the $S_0NR$ degradation caused by too large of an Mrt in the lower layers.

For a fuller understanding of the nature and advantages of the present invention, reference should be made to the following detailed description taken together with the accompanying figures.

DETAILED DESCRIPTION OF THE INVENTION

Prior Art

Figure 2:
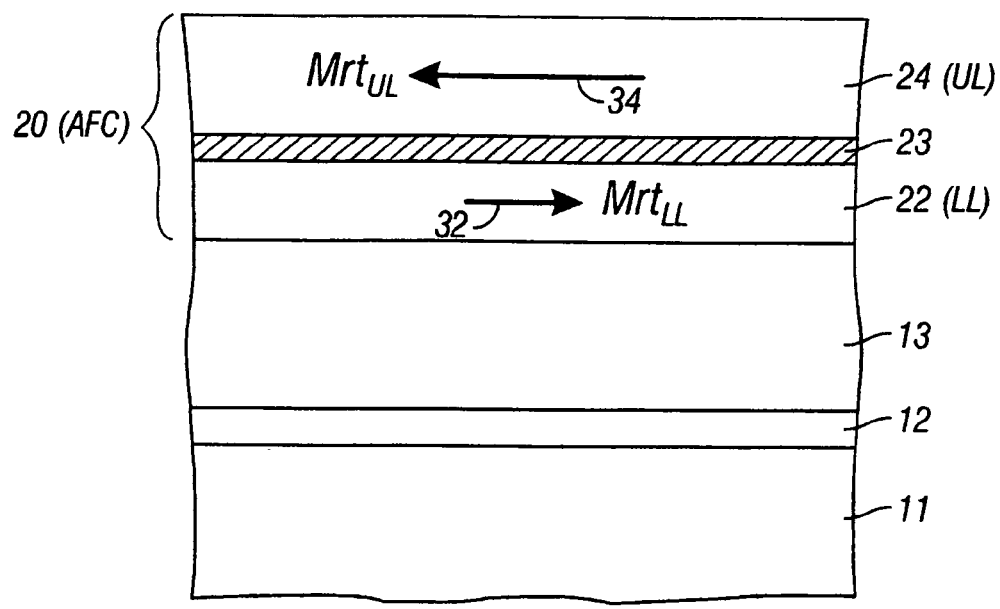
FIG. 2 is a schematic sectional view of an AFC magnetic recording disk according to the prior art.

FIG. 2 illustrates the cross sectional structure of a disk with an antiferromagnetically-coupled (AFC) magnetic layer 20 according to the prior art. The disk substrate 11 is any suitable material, such as glass, SiC/Si, ceramic, quartz, or an AlMg alloy base with a NiP surface coating. The seed layer 12 is an optional layer that may be used to improve the growth of the underlayer 13. The seed layer 12 is most commonly used when the substrate 11 is nonmetallic, such as glass. The seed layer 12 has a thickness in the range of approximately 1 to 50 nm and is one of the materials, such as Ta, CrTi, NiAl or RuAl, which are useful as seed materials for promoting the growth of subsequently deposited layers in certain preferred crystalline orientations. A pre-seed layer (not shown) may also be used between the glass substrate 11 and the seed layer 12. The underlayer 13 is deposited onto the seed layer, if present, or otherwise directly onto the substrate 11, and is a nonmagnetic material such as chromium or a chromium alloy, such as CrV, CrTi or CrMo. The underlayer 13 has a thickness in the range of 5 to 100 nm with a typical value being approximately 10 nm. A protective overcoat (not shown), such as amorphous carbon, is formed as the top layer over the AFC layer 20.

The AFC magnetic layer 20 is made up of a lower ferromagnetic layer (LL) 22 and an upper ferromagnetic layer (UL) 24, separated by a nonferromagnetic spacer layer 23 that acts as an antiferromagnetically-coupling layer. The nonferromagnetic spacer layer 23 thickness and composition are chosen so that the magnetic moments 32, 34 of adjacent layers 22, 24, respectively, are antiferromagnetically-coupled through the nonferromagnetic spacer layer 23 and are antiparallel in zero applied field, i.e., the remanent magnetic state. The two antiferromagnetically-coupled layers 22, 24 of layer 20 have magnetic moments that are oriented antiparallel, with the upper layer 24 having a larger moment. Thus $Mrt_{UL}$ is greater than $Mrt_{LL}$, and the composite Mrt for the AFC layer 20 is ($Mrt_{UL}-Mrt_{LL}$).

The antiferromagnetic coupling of ferromagnetic layers via a nonferromagnetic transition metal spacer layer, like the AFC structure of layer 20 in FIG. 2, has been extensively studied and described in the literature. In general, the exchange coupling oscillates from ferromagnetic to antiferromagnetic with increasing spacer layer thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", *Phys. Rev. Lett.*, Vol. 64, p. 2034 (1990). The material combinations include ferromagnetic layers made of Co, Fe, Ni, and their alloys, such as Ni—Fe, Ni—Co, and Fe—Co, and nonferromagnetic spacer layers such as Ru, chromium (Cr), rhodium (Rh), iridium (Ir), copper (Cu), and their alloys. For each such material combination, the oscillatory exchange coupling relationship has to be determined, if not already known, so that the thickness of the nonferromagnetic spacer layer is selected to assure antiferromagnetic coupling between the two ferromagnetic layers. The period of oscillation depends on the nonferromagnetic spacer material, but the strength and phase of the oscillatory coupling also depends on the ferromagnetic material and interfacial quality.

For this AFC structure 20 the orientations of the magnetic moments 32, 34 of adjacent ferromagnetic layers 22, 24, respectively, are aligned antiparallel and thus add destructively. Because the two ferromagnetic layers in the AFC structure serve different functions with respect to recording, their material properties are substantially different. The upper layer 24 typically has small magnetic grains with almost no intergranular exchange coupling, and has high intrinsic coercivity ($H_0$~8 kOe). These properties for the upper layer 24 are geared toward obtaining the best $S_0NR$. The upper layer 22 is typically a CoPtCrB alloy such as $Co_{68}Pt_{13}Cr_{19}B_{10}$. The lower layer 22 is typically a material with a large amount of intergranular exchange coupling and low intrinsic coercivity ($H_0$~1 kOe). These properties facilitate the PW50 reduction and the material is typically a CoCr alloy, with low Cr content (Cr<15 atomic percent), such as $Co_{89}Cr_{11}$. The material used for the lower layer cannot be used as the upper layer for high performance media. The nonferromagnetic spacer layer 23 is typically ruthenium (Ru).

FIG. 2 is shown for an AFC magnetic layer 20 with a two-layer structure and a single spacer layer. AFC media with more than two ferromagnetic layers and additional antiferromagnetically-coupling spacer layers have been suggested, but no such media have been able to achieve both a reduction in composite Mrt and $S_0NR$.

The Invention

Figure 3:
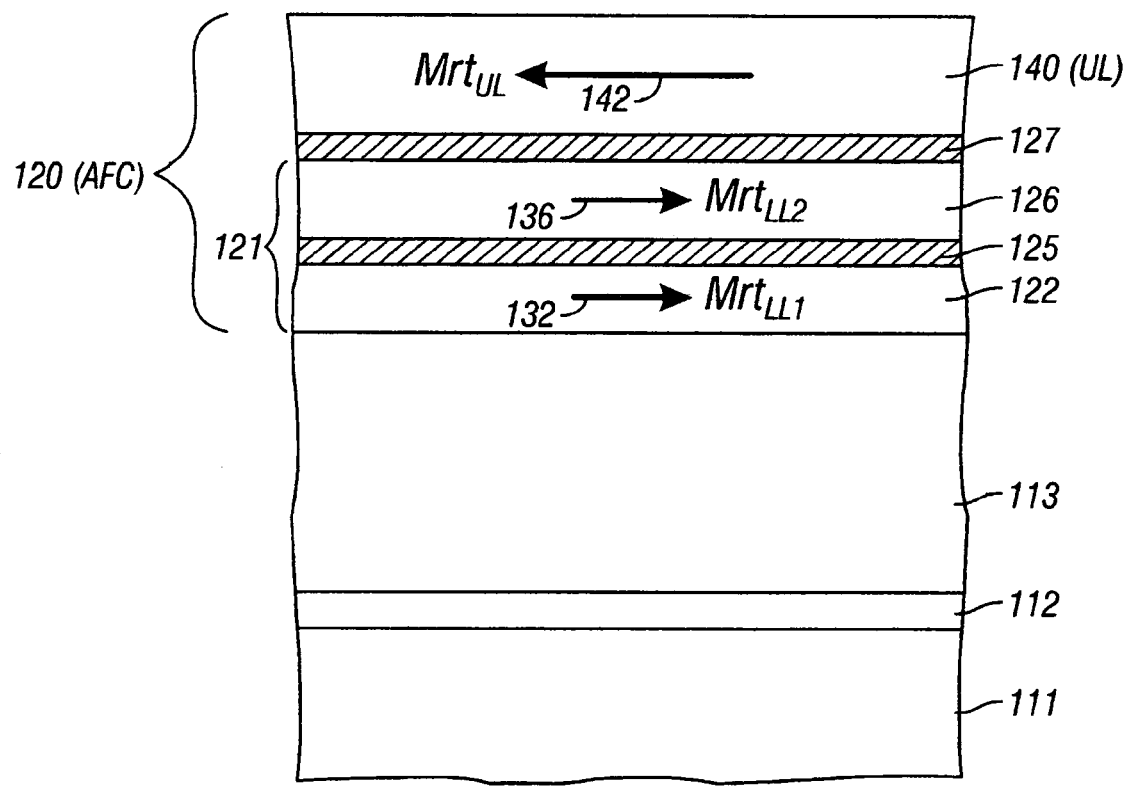
FIG. 3 is a schematic sectional view of an AFC magnetic recording disk according to the present invention.

The invention is an AFC media that overcomes the current limitations of AFC media and enables lower Mrt and PW50 to be achieved without compromising $S_0NR$. This structure is shown in FIG. 3 and comprises an AFC layer 120 formed over a conventional underlayer 113 and seed layer 112 on a substrate 111.

The AFC layer 120 comprises a lower layer structure 121, an upper ferromagnetic layer (UL) 140, and an antiferromagnetically-coupling layer 127. Ferromagnetic layer 140 is called the upper ferromagnetic layer because it is the topmost layer in the AFC structure 120. The lower layer structure 121 comprises two lower ferromagnetic layers (LL1, LL2) (122, 126, respectively) ferromagnetically-coupled across a ferromagnetically-coupling layer 125. AFC layer 120 has two remanent magnetic states (zero applied magnetic field). The magnetization direction of each layer in one of these states is shown by arrows 132, 136, 142. In the other state, the directions of all the arrows would be reversed.

The ferromagnetically-coupling layer 125 is any material that has a composition and thickness resulting in ferromagnetic exchange coupling of layers 122, 126. Preferably the layer 125 should have a hexagonal-close-pack (hcp) crystalline structure to promote the growth of the hcp Co-alloy ferromagnetic layer 126. The material for ferromagnetically-coupling layer 125 is preferably a CoRu alloy, with Ru greater than approximately 40 atomic percent (at. %) and less than approximately 70 at. %. Other elements that can be added to the CoRu alloy include B (less than approximately 20 at. %) and Cr (less than approximately 20 at. %). Other materials for ferromagnetically-coupling layer 125 include a CoCr alloy, with Cr greater than approximately 27 at. % and less than approximately 45 at. %, and Pt and Pd. The thickness for these ferromagnetically-coupling layers should be between approximately 0.5 and 5 nm. The exchange constant J characterizing the coupling across the ferromagnetically-coupling layer should be greater than approximately 0.02 ergs/cm$^2$ but less than approximately 0.40 ergs/cm$^2$. Materials such as Ru and Cr, which exhibit oscillatory coupling behavior with thickness changes, could potentially be used as ferromagnetically-coupling layers if, when their thickness is adjusted into the ferromagnetic regime, the value of J is greater than 0.02 ergs/cm$^2$.

The UL has an Mrt greater than the sum of the Mrt values of LL1 and LL2. These relative Mrt values are represented by the relative length of arrows 132, 136, 142. The composite Mrt of the AFC structure 120 is given by:

$$Mrt_{COMPOSITE}=Mrt_{UL}-(Mrt_{LL1}+Mrt_{LL2}) \quad \text{(Eq. 1)}$$

Each of the lower layers LL1, LL2 can have an Mrt equal to the maximum Mrt of the single lower layer in the conventional AFC structure. Because this composite Mrt reduction is achieved without increasing the Mrt of any of the lower layers above the maximum Mrt of the single lower layer in the conventional AFC structure, there is no degradation in $S_0NR$ that would otherwise be caused by too large of an Mrt in the lower layers. The AFC structure of this invention can be made without the need to change the composition or increase the thickness of any of the lower layers from the composition and thickness of the single lower layer in the conventional AFC structure. Since UL 140 is antiferromagnetically coupled to the lower layer structure 121, and the bottom ferromagnetic layers LL1 122 and LL2 126 are made of thin alloys with a low intrinsic coercivity $H_0$, like the alloys used in the conventional AFC structure, the magnetization pattern recorded into the upper ferromagnetic layer UL will determine the magnetization orientation of the lower ferromagnetic layers LL1, LL2.

Figure 1:
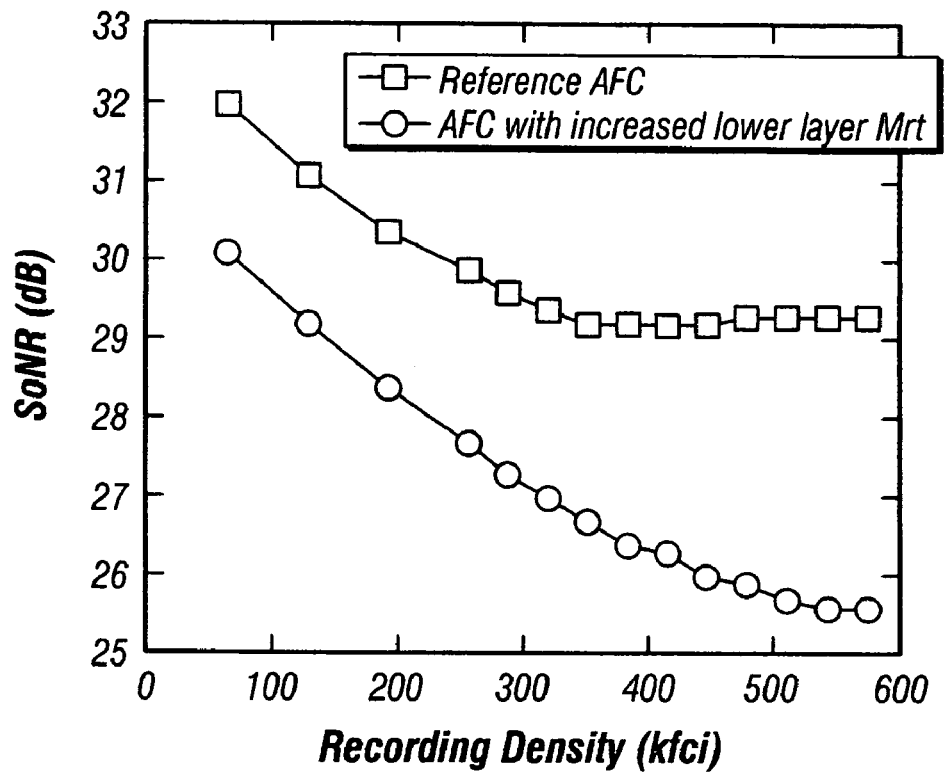
FIG. 1 is a graph of $S_0NR$ vs. recording density in thousand flux changes per inch (kfci) for a conventional AFC structure and for an AFC structure having a lower layer with an increased Mrt.
Figure 4:
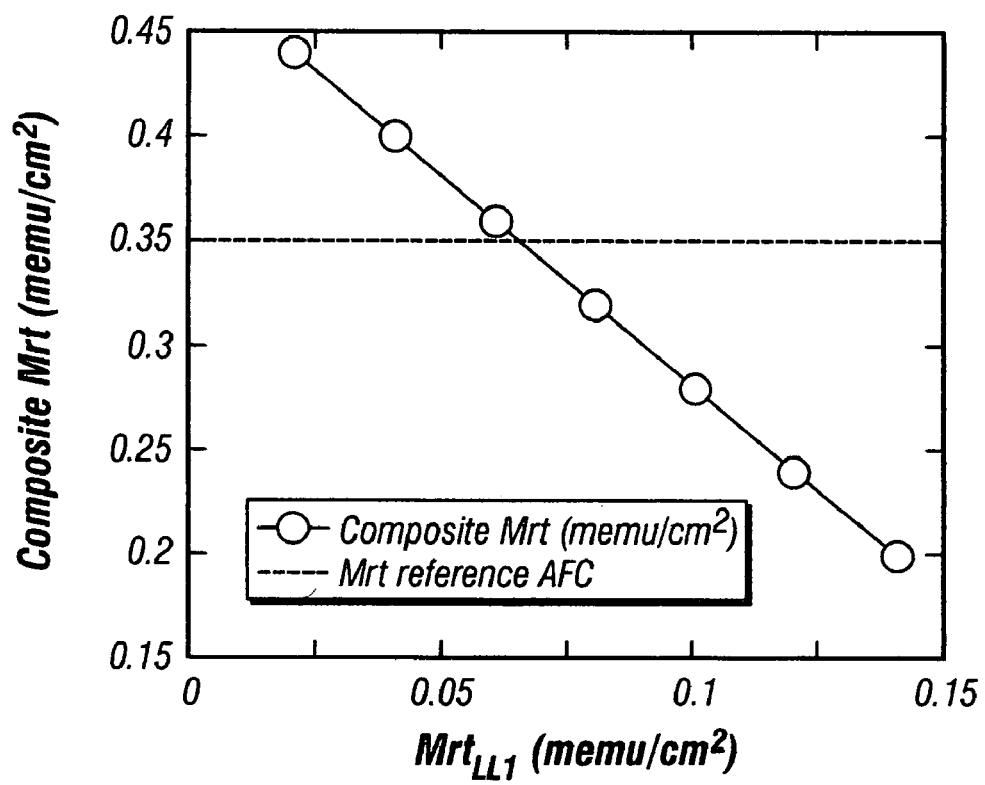
FIG. 4 shows the composite Mrt of the AFC structure of this invention as a function of the Mrt of the lower layers.

FIG. 4 shows the composite Mrt of a series of these structures as function of changing only $Mrt_{LL1}$ (assuming $Mrt_{LL1}=Mrt_{LL2}$). The larger the value of $Mrt_{LL1}$, the smaller the composite Mrt. By increasing $Mrt_{LL1}$ up to approximately 0.13 memu/cm$^2$ the composite Mrt can be reduced by 0.13 memu/cm$^2$ below the reference AFC structure (0.22 memu/cm$^2$ compared to 0.35 memu/cm$^2$). The AFC structure of this invention thus achieves a reduction in PW50 for a given UL thickness without compromising $S_0NR$, and thus overcomes one of the fundamental limitations of conventional AFC media.

The preferred material for the UL is a CoPtCrB alloy with Cr between approximately 16 and 22 atomic percent (at. %), Pt between approximately 12 and 20 at. %, and B between approximately 7 and 20 at. %. Other elements, such as Ta, can be added to this CoCrPtB alloy. The preferred material for each of the lower layers LL1, LL2 is a CoCr alloy with Cr between approximately 5 and 24 at. %. Other elements can be added to this CoCr alloy, such as B (less than 6 at. %), Ta (less than 5 at. %) and Pt (less than 10 at. %). Ta is especially beneficial to the segregation of the Cr in the CoCr alloy as well as facilitating the epitaxial growth of the subsequently deposited layers. The UL can also be a composite UL of two or more CoPtCrB alloys stacked on top of each other and directly exchange coupled to each other. References herein to the composition range of the UL will mean the average composition of the multiple alloys if the UL is a composite UL.

The AFC structure described above is not limited to the implementation with only two lower layers. For example, the lower layer structure may include one or more additional lower layers and corresponding ferromagnetically-coupling layers. Referring to FIG. 3 if there were to be three lowers layers in lower layer structure 121, then a second ferromagnetically-coupling layer would be located on LL2 126 and the third lower layer LL3 would be located between the second ferromagnetically-coupling and antiferromagnetically-coupling layer 127. In this example the composite Mrt of the AFC structure would be expressed as:

$$Mrt_{COMPOSITE}=Mrt_{UL}-(Mrt_{LL1}+Mrt_{LL2}+Mrt_{LL3}) \quad \text{(Eq. 2)}$$

The Mrt of the UL in this AFC structure is greater than the sum of the Mrt values of LL1, LL2 and LL3. In this example, if the Mrt of each of the three lower layers was approximately 0.13 memu/cm$^2$ (approximately the maximum Mrt of the single lower layer in the reference AFC structure of FIG. 2) then the composite Mrt would be reduced by 0.26 memu/cm$^2$ below the reference AFC structure (0.09 memu/cm$^2$ compared to 0.35 memu/cm$^2$).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
a substrate; and
an antiferromagnetically-coupled structure on the substrate and having two remanent magnetic states in the absence of an applied magnetic field, the structure comprising
(a) a first lower ferromagnetic layer having a remanent magnetization Mr, a thickness t and a remanent-magnetization-thickness product Mrt; (b) a ferromagnetically-coupling layer on the first lower ferromagnetic layer, (c) a second lower ferromagnetic layer on the ferromagnetically-coupling layer and having an Mrt; (d) an antiferromagnetically-coupling layer on the second lower ferromagnetic layer; and (e) an upper ferromagnetic layer on the antiferromagnetically-coupling layer, wherein the upper ferromagnetic layer has an Mrt greater than the sum of the Mrt values of the first and second lower ferromagnetic layers and an intrinsic coercivity greater than the intrinsic coercivity of each of the first and second lower ferromagnetic layers;
and wherein, in each remanent state, the magnetization directions of the first and second lower ferromagnetic layers are substantially parallel to one another and antiparallel to the magnetization direction of the upper ferromagnetic layer, and the magnetization direction of the upper ferromagnetic layer in one remanent state is substantially antiparallel to its magnetization direction in the other remanent state.

2. The disk of claim 1 wherein the lower ferromagnetic layers have substantially the same Mrt.

3. The disk of claim 1 wherein the ferromagnetically-coupling layer is an alloy comprising Co and Ru, wherein Ru is present in the alloy in an amount greater than approximately 40 atomic percent and less than approximately 70 atomic percent.

4. The disk of claim 1 wherein the ferromagnetically-coupling layer is an alloy comprising Co and Cr, wherein Cr is present in the alloy in an amount greater than approximately 27 atomic percent and less than approximately 45 atomic percent.

5. The disk of claim 1 wherein the ferromagnetically-coupling layer consists essentially of Pt or Pd.

6. The disk of claim 1 wherein the ferromagnetically-coupling layer has a thickness between approximately 0.5 and 5 nm.

7. The disk of claim 1 wherein the ferromagnetically-coupling layer consists essentially of Ru or Cr having an exchange constant greater than approximately 0.02 ergs/cm$^2$.

8. The disk of claim 1 wherein the upper ferromagnetic layer is an alloy comprising Co, Pt, Cr and B, and wherein each of the lower ferromagnetic layers is an alloy comprising Co and Cr with less than 10 atomic % Pt.

9. The disk of claim 8 wherein each of the lower ferromagnetic layers is an alloy further comprising Ta.

10. The disk of claim 1 wherein the antiferromagnetically-coupling layer is a material selected from the group consisting of ruthenium (Ru), chromium (Cr), rhodium(Rh), iridium(Ir), copper(Cu), and their alloys.

11. The disk of claim 1 further comprising an underlayer located on the substrate between the substrate and the first lower ferromagnetic layer.

12. The disk of claim 1 further comprising a protective overcoat formed over the upper ferromagnetic layer.

13. A magnetic recording disk comprising:
a substrate; and
an antiferromagnetically-coupled (AFC) magnetic recording layer on the substrate and capable of having two remanent magnetic states in the absence of an applied magnetic field, the AFC magnetic recording layer having a composite remanent-magnetization-thickness product Mrt(COMPOSITE) less than the Mrt(COMPOSITE) of an AFC reference structure comprising an identical upper ferromagnetic layer, wherein the AFC reference structure has a upper ferromagnetic layer with an Mrt value of Mrt(UL) and an antiferromagnetically-coupled single lower ferromagnetic layer with an Mrt value of Mrt(SLL-Max), wherein Mrt(SLL-Max) corresponds to the Mrt of a single lower ferromagnetic layer that results in the maximum achievable signal-to-noise ratio (SNR) for the AFC reference structure, the AFC magnetic recording layer comprising:
(a) a first lower ferromagnetic layer having an Mrt value of Mrt(LL1); (b) a ferromagnetically-coupling layer on the first lower ferromagnetic layer, (c) a second lower ferromagnetic layer on the ferromagnetically-coupling layer wherein the second lower ferromagnetic layer has an Mrt value of Mrt(LL2); (d) an antiferromagnetically-coupling layer on the second lower ferromagnetic layer; and (e) an upper ferromagnetic layer on the antiferromagnetically-coupling layer wherein the upper ferromagnetic layer has an Mrt value of Mrt(UL) and greater than the sum of Mrt(LL1) and Mrt(LL2), and an intrinsic coercivity substantially greater than the intrinsic coercivity of each of the first and second lower ferromagnetic layers;
wherein each of said first and second lower ferromagnetic layers has a Mrt value up to Mrt(SLL-Max); and
wherein, in each remanent state, the magnetization directions of the first and second lower ferromagnetic layers are substantially parallel to one another and antiparallel to the magnetization direction of the upper ferromagnetic layer, and the magnetization direction of the upper ferromagnetic layer in one remanent state is substantially antiparallel to its magnetization direction in the other remanent state.

14. The disk of claim 13 wherein the upper ferromagnetic layer is an alloy comprising Co, Pt, Cr and B, and wherein each of the lower ferromagnetic layers is an alloy comprising Co and Cr with less than 10 atomic % Pt.

* * * * *